Aug. 27, 1957        G. D. KING        2,804,418
OVERLAID WOODY MATERIAL AND METHOD OF MAKING THE SAME
Filed Oct. 19, 1955
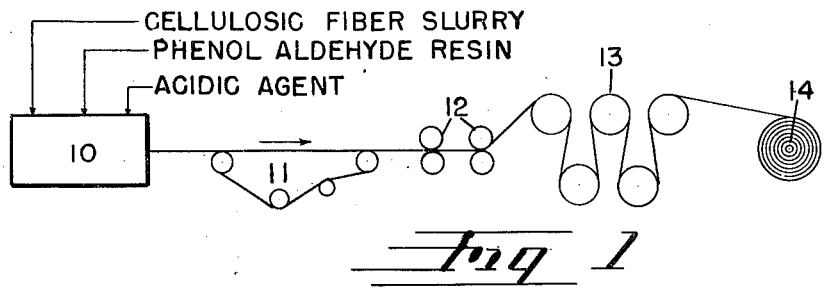
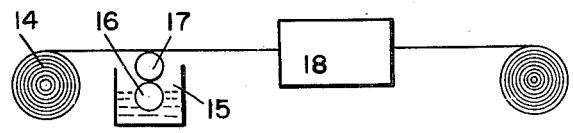
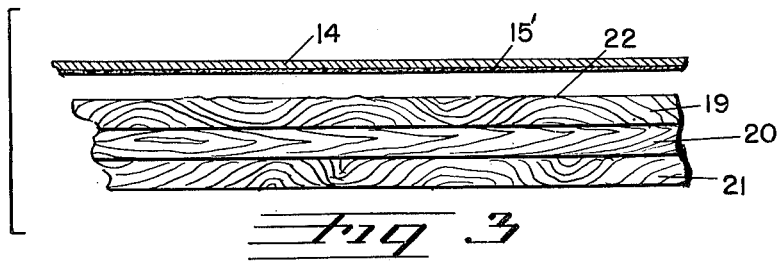
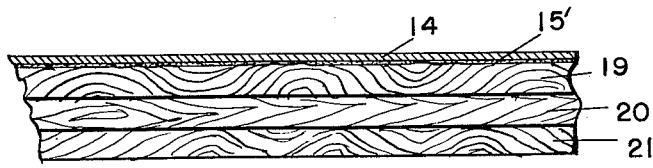
INVENTOR.
GLENGARRY D KING
BY
ATTORNEY

2,804,418
OVERLAID WOODY MATERIAL AND METHOD OF MAKING THE SAME

Glengarry D. King, West Linn, Oreg., assignor to Crown Zellerbach Corporation, San Francisco, Calif., a corporation of Nevada Application October 19, 1955, Serial No. 541,541

6 Claims. (Cl. 154—100)

This invention relates in general to the making of a composite product comprising a base or board of woody material having an overlay applied on at least one face, the overlay consisting of a resin-containing, cellulosic, fibrous sheet.

More specifically, the present invention relates to such a composite product consisting of a board of woody material, particularly a plywood board or panel, with which an overlay sheet of cellulosic, resin-containing, fibrous material, particularly resin-containing paper, has been combined; and this application is a continuation-in-part of my application, Serial No. 382,451, bearing the same title, filed under date of September 25, 1953, now abandoned, the latter or parent application having been filed as a continuation-in-part of the then pending application, Serial No. 222,264, of Glengarry D. King and Russell V. Harkema, filed under date of April 21, 1951, entitled "Method of Making Masked Lignocellulosic Material," which has subsequently issued as Patent No. 2,666,726.

As is well known, the application of resin-containing papers to the face of plywood, in the form of what is commonly called "overlay," is being used extensively as a practical means of enabling poorer grades of plywood to be employed. The "overlay" serves not only more or less to mask the imperfections of the plywood, but also to give the composite overlaid panel or board improved properties. For example, the raw surface of plywood has a tendency, varying with the different woods used for plywood, to check and warp and develop uneven grain expansion or "grain rise" under exterior exposure conditions. The raw surface of the plywood also is not a very satisfactory surface for painting inasmuch as the varying wood grain density of the plywood surface causes varying degrees of paint absorption, and, under exterior exposure conditions, also generally results in the uneven weathering of the painted surface. On the other hand a resin-containing overlay can provide a facing which offers greater resistance to weather, greater resistance to abrasion, and a surface which is more satisfactory for painting.

An object of the present invention is to produce an improved composite material, comprising a base board or panel of woody material, such as plywood, combined with an overlay which will have a superior weather resistant surface and a surface which will exhibit no checking or grain rise under exterior exposure or other similar and severe conditions.

A related object is to provide such a composite material with an improved surface which will not only be smooth and uniform but which will be better suited for painting and result in longer life for the paint film.

A further object of the invention is to provide an improved plywood panel consisting of plywood surfaced with a resin-containing, cellulosic, fibrous sheet as an overlay, which overlay will be practical and inexpensive to produce, and which composite panel will have improved structural characteristics and a surface durability superior to paper-overlaid plywood panels previously developed.

A particular and special object of this present invention is to provide a highly satisfactory composite panel which may consist of inferior grade plywood, thus plywood of the type requiring masking, and a permanent overlay meeting the highest requirements for surface durability and finish, which overlay will be thoroughly and intimately bonded to the plywood face throughout its entire extent regardless of the imperfections or irregularities in the covered plywood surface.

One of the methods commonly employed for producing the resin-containing paper used as overlay for plywood is to impregnate or saturate the paper sheet, after the sheet is formed on the conventional paper machine, with a resinous composition. There are several objections to this common method of producing the overlay. The method requires special equipment for the impregnation which differs from the equipment normally existing in paper mills. This impregnation process dictates the use of a low molecular weight resin. Before such resin-containing sheet can be used for a masking overlay for plywood, the impregnating resin must be precured at least to the point where the resin flow will be limited to such a degree as to prevent undesirable grain show-through, when the overlay is finally united with the plywood by means of heat and pressure. If there is not sufficient curing of the resin prior to the final pressing operation an unsatisfactory surfacing will result, the resin will flow during the pressing and the grain of the plywood will show through the overlay. The preliminary curing of the impregnating resin, particularly since a low molecular weight resin is employed, usually causes migration of the resin to the paper surface, leaving a starved center. As a result, the overlay is more apt to delaminate or split within its center after it is pressed to the plywood.

Another method of making a resin-bearing sheet for overlaying plywood involves incorporating a thermosetting resin into the base sheet by either impregnation or beater-addition process, and thereafter advancing the resin in the sheet to a high degree of cure prior to its use in the masking of a plywood face, which would be accomplished by giving the resin-containing sheet an additional heat treatment to cure the resin in the sheet to a highly advanced state. The use of a sheet in which the resin has obtained a high degree of cure, for overlaying plywood board presents, however, certain disadvantages. Thus, when such a sheet is hot-pressed to the board which is to be masked, there is substantially no resin flow so that highly desirable intimate bond between the entire surface of the plywood board where there are rough spots and irregularities and masking sheet will not be achieved. Furthermore, curing of the resin to a high degree renders the sheet brittle, so that such a sheet may very likely crack or break during handling before it is applied to the plywood as an overlay.

Still another method of producing a resin-contacting sheet for plywood overlay involves the application of resin at two intervals in the making of the paper sheet. A water-insoluble resin in powdered form is first added to the pulp in the beater and later the sheet is further impregnated with a water-soluble phenolic resin. This method of manufacturing the overlay involving the application of the resin in two stages, in the making of the sheet is described in the United States Patent No. 2,497,712, issued February 14, 1950, to R. J. Auchter, and entitled "Process of Manufacturing a Fibrous Sheet Covered Plywood." An objection to this procedure is that the treatment requires two types of resin and the addition of the resins at two separate stages, which is both troublesome and expensive.

A further object of the present invention is to provide an improved process for producing the desired resin-containing overlay sheet which will avoid the disadvantages involved in the methods or processes heretofore followed.

The attainment of these objects and other advantages will be explained in the course of the following description of my invention and of a preferred method of practicing the same.

In brief, in the carrying out of my invention I produce a resin-containing heavy paper sheet or overlay in such a manner that, as presently explained, the entire amount of the desired resin is added to the pulp from which the sheet is made and is precipitated on the fibers before the sheet is formed on the Fourdrinier wire in the paper-making machine. The sheet is then formed on the paper-making machine in accordance with the conventional practice, but results in a resin-containing sheet which is substantially dry, hard-surfaced, flexible, tough throughout and opaque to considerable degree. The resulting sheet has all the requisites for a highly satisfactory overlay. It does not require any additional resin saturation or impregnation or any further curing of the resin before it is used as an overlay. The sheet is then coated on one face with a suitable adhesive and united with a plywood panel, or other board or panel of woody material, in a hot press under such temperature and pressure condition as to effect a permanent bond between the sheet and the plywood or other base, and produces a finished, durable, smooth surfacing on the plywood, or other base, which is considerably tougher and harder than the plywood or other base itself. Furthermore, when such a sheet is adhesively secured to the plywood panel, the surface of the panel has a lower paint demand than that covered with an impregnated sheet, yet a good paint film bond is obtained.

I have discovered that the desired resin-containing overlay sheet can be produced more satisfactorily and more efficiently by adding the entire amount of resin for the sheet to the pulp slurry in the beater and thus forming the resin-containing sheet in a single operation without any subsequent impregnation or saturation or resin pre-curing step. Not only does such process offer the advantage of dispensing with the need for any equipment for subsequent resin impregnation of the sheet, but the process also results in more uniform distribution of the resin throughout the thickness of the sheet, i. e. there is no higher concentration of resin on the surface of the sheet as occurs commonly in the resin-impregnated sheets.

It is known that during the impregnation of the sheet of paper, the impregnating resin penetrates the fiber cell wall to a certain extent. The amount of resin which has penetrated into the fiber is effectively lost as far as contributing to the formation of a bond between the individual fibers. Thus, the impregnation method gives as a result an ineffective utilization of a part of the resin employed.

In contrast to the foregoing, the resin added to the pulp and precipitated on the fibers does not penetrate into the fiber cell wall, but its small particles are attached to the surfaces of the fibers and remain so attached in the finished sheet of paper primarily at the places where the fibers cross each other. This latter technique of resin addition according to my invention results in a more efficient use of the resin in producing a strong fiber-to-fiber bond. The strength of the fiber-to-fiber bond determines to a large extent the ultimate properties of the finished paper overlay.

Referring to the accompanying drawings:

Figure 1 is a schematic illustration of the method of manufacturing the resin-containing overlay sheet of the present invention;

Figure 2 is a corresponding schematic illustration of the method of applying resin glue to one face of the resin-containing overlay sheet;

Figure 3 is an enlarged, fragmentary, cross-sectional view showing the constituent parts forming an overlaid plywood board in accordance with the present invention; and Figure 4 is a fragmentary, cross-sectional view, similar to Figure 3, showing the completed overlaid plywood board.

In Figure 1, in which the customary type of Fourdrinier paper machine is illustrated, 10 indicates either the beater or the headbox or other suitable mixing device in which the resin is mixed with the pulp prior to the flowing of the pulp onto the Fourdrinier wire, the Fourdrinier wire being indicated at 11. The wet press section of the paper machine is indicated at 12 and the drying section at 13. The resin-containing sheet, after being completed on the paper machine, is indicated at 14 as being shown wound into a roll, as is customary with ordinary paper. Since the resin-containing sheet is not brittle, as later explained, it is preferably kept in the convenient roll form until used.

Assuming that the amount of resin in the sheet 14 is not more than about 100% of resin solids by weight based on the dry weight of the fibers, as later described, a coating of resin glue is then given to one face of the sheet 14. In Figure 2 the tank or container for such resin glue is indicated at 15, the glue-applying rollers being indicated at 16 and 17, and 18 is the dryer in which the water in the glue coating on the sheet is substantially evaporated before the sheet is rewound into a roll.

In Figure 3 the plywood board, to which the overlay sheet 14 is to be applied, comprises the two veneer layers 19 and 21 and the core layer 20. The glue coating on the overlay sheet is indicated at 15', and the plywood surface for which the overlay is required is indicated at 22.

In Figure 4 the overlay sheet is shown united to the plywood by means of heat and pressure as later described.

Various types of pulp may be employed in making the sheet or paper overlay in accordance with my invention. Thus, softwood or hardwood pulps prepared by either acid or alkaline conventional cooking processes may be used. A certain amount of mechanical pulp or groundwood may be added to any of the above mentioned pulps. I have found, however, that the preferred pulp furnished is composed of 90% softwood unbleached sulfite and 10% of a book-grade groundwood. Although the percentage of groundwood used may be varied from 5% to 20%, it has been observed that with increasing groundwood content the abrasion resistance of the paper decreases, and with decreasing groundwood content the resin retention and sheet formation are somewhat adversely affected. If other types of pulp are used, they would have to be cooked and refined in such a manner as to give to the final sheet satisfactory woodworking properties.

The degree of beating or refining to which the pulp is preferably subjected is important in determining the final properties of the overlay. A considerable amount of fiber cutting, as by jordaning, is desirable in case of long-fibered pulp to afford a short "fiber pull" and to make the cured sheet more "woody" in character. Also, a certain amount of fibrillation, as by beating, is desirable in order to improve the resin retention and distribution. Usually, refining of unbleached sulfite pulp in a conventional Jordan refiner to about 600 milliliters Canadian Standard Freeness will prove sufficient.

The groundwood pulp, if used, should preferably not be refined, but added to the long fibered pulp at the beater after its refining has been completed.

The pH of the pulp slurry prior to addition of the resin should be approximately neutral or slightly alkaline to avoid a premature precipitation of the resin which would take place under acidic conditions.

The temperature of the aqueous pulp suspension should be adjusted before addition of the resin. A temperature range of 70° to 80° F. has been found to be satisfactory. At temperatures above this range the resin may "granulate" or appear as brown spots in the finished sheet. At temperatures lower than 70° F., the resin retention in the sheet decreases.

A resin suitable for incorporation into the pulp at the beater must have certain qualities necessary for such "wet-end" addition process. A satisfactory resin is an alkaline, thermosetting, high-molecular weight, water-soluble phenol-aldehyde type resin, such as phenol-formaldehyde, characterized by being readily emulsified upon dilution with water and then capable of being precipitated by acids or acid salts in the form of small particles that are retained by the fibers. It is necessary that the resin be characterized by a high formaldehyde-phenol ratio with a sodium content of from 1½% to 3% in the mixture. Its dilutability with water should be from about 1.5 parts water to 1 part resin to about 5 parts water to 1 part resin at a temperature of 25° C. The preferred dilutability ratio is about 3 parts water to 1 part resin. The "beater stickpoint" range of the resin should be from about 90° F. to about 105° F., and the preferred range should be from 95° F. to 100° F. By "beater stickpoint" is meant the temperature at which precipitated resin particles in aqueous suspension will become tacky enough to stick together. When such test is carried out under standardized conditions, it gives a measure of the degree of advancement of the resin. Another characteristic property of such a resin is that, after its addition to, and precipitation on the fibers, it should not change the original freeness of the pulp beyond 30 milliliters Canadian Freeness. The pH of the liquid resin should be from about 8 to about 9.5.

A suitable resin having substantially the above stated properties may be prepared as follows: a 20-gallon stainless steel, covered, jacketed kettle fitted with a stirrer, condenser and thermometer well, is charged with the following ingredients:

25 lbs. crystalline phenol
15 lbs. paraformaldehyde, tech. powdered
1 lb. 5 oz. sodium hydroxide tech., flakes
31 lbs. 3 oz. water The mixture is stirred and heated with steam until the temperature rises to 65° C., after which the reaction carries itself readily. At 70° C. water is run into the jacket and by adjusting the quantity of water, the temperature is raised to 90° C. and held there 125 minutes. The mixture is then cooled as rapidly as possible by running cooling water through the jacket. When the temperature falls to 60° C. the charge is drained through the bottom outlet, giving 71 pounds of clear yellow liquid resin with a beater stickpoint of 100° F. (37.8° C.) and a water dilution ratio of about 3.5 parts water to 1 part resin.

Other commercially available thermosetting water-soluble phenol-aldehyde resins having similar properties to the above described resin and which I have found very satisfactory to use in practicing my invention are: "Synco 721" manufactured by the Snyder Chemical Corporation of Bethel, Connecticut, and "Amres 1410," formerly designated as "Amres 4971," manufactured by the American Marietta Company of Chicago, Illinois.

There are a number of precipitating agents which may be used to coagulate or precipitate the resin after it has been added to the pulp slurry. These agents, which must be acidic in character, include acid, acid salts, or combinations thereof. My preferred precipitating agent is a 15% aqueous solution of papermaker's alum (15 parts of aluminum sulfate hydrate, containing 18 molecules of water, in 100 parts water). Aqueous mixtures of papermaker's alum and sulfuric acid are also very satisfactory.

The addition of the resin to the aqueous slurry of cellulosic fibers and its subsequent precipitation on the fibers may be carried out in a conventional beater or any other suitable mixing device. Optionally, the resin and the precipitating agent may be added continuously to the pulp in the headbox or any other place in the system before the formation of the sheet on the paper machine takes place.

The quantity of the resin added to the pulp depends on the type of final overlay desired. At low percentages, such as from 5% to 10% of resin solids based on the weight of dry pulp, some wet-strength is imparted to the sheet of paper, but the sheet after pressing is still substantially paper-like in character. At intermediate percentages, such as from 10% to 45% of resin solids based on the weight of dry pulp, the sheet after pressing becomes progressively more brittle, more abrasion-resistant, and more water-resistant. Finally, at high percentages from 45% to about 300% of resin solids based on the weight of dry pulp, the paper structure progressively disappears and the sheet, bonded to a plywood panel, appears as a sheet of solid translucent plastic in the upper range of resin content. If the sheet contains from about 100% to 300% of resin solids based on weight of dry pulp, the coating of the sheet with an adhesive or resin glue becomes unnecessary to achieve a satisfactory bonding of the sheet to the plywood, as the amount of resin present in the sheet is sufficient to produce a firm bond. The quantity of resin to be added to pulp for a satisfactory "paint-grade" plywood overlay is from about 10% to 45% of resin solids based on the weight of dry pulp. However, the preferred quantity for a highly satisfactory "paint-grade" is from about 30% to 35% of resin solids based on the weight of dry pulp.

It is most important, if the overlay is not to be restricted to use with very smooth surfaced boards, and thus if the overlay is to be used on plywood, such as inferior grade plywood, on which there will presumably be some surface roughness and irregularities (and it is in such use that certain overlays previously developed have not proved entirely satisfactory under all conditions), that the resin in the overlay is given no more than a slight partial cure until such time as the overlay is finally secured to the board. When the resin in the overlay sheet has received only such partial cure, then when the overlay sheet is being applied to the board some flow of the resin takes place wherever this is necessary for effecting a thoroughly complete, intimate and enduring bond throughout the entire surface area regardless of roughness and irregularities in the board surface. I have found that this necessary restricted partial cure of the resin contained in the overlay sheet will be obtained very satisfactorily as a result of the normal passage of the resin-containing sheet through the customary drying section of a commercial paper machine, as indicated at 13 in Figure 1. In other words, I have found that the desired partial curing of the resin in the sheet, prior to the bonding of the sheet to the board as an overlay, is obtained by raising the temperature of the sheet for a very short period to a value not exceeding approximately 212° F. As is well known, in the customary commercial paper machine, such as the paper machine illustrated in Figure 1, the continuous paper web or sheet, after leaving the press section, passes through the drying section in which the temperature of the sheet is raised gradually from about 100° F. to somewhere in the neighborhood of 212° F., the time required for the passage through the drying section generally not exceeding 3 or 4 minutes, depending upon the speed of the machine, and consequently the length of the period during which the sheet reaches a maximum temperature of 212° F. will be considerably less than four minutes. During the passage of the sheet through the drying section of the paper machine the moisture content of the sheet will generally be reduced from about 70% to from 3% to 12%. Thus the passage of my resin-treated sheet through the drying section of the paper machine produces the desired preliminary restricted amount of cure of the resin, which I have found to be important in the proper carrying out of the invention, so that the further curing of the resin will be deferred until the final bonding of the overlay sheet to the board. Not only will the resin in the sheet have received the desired restricted partial cure when the sheet leaves the paper machine but the sheet, while being substantially dry, will not be brittle, as would be the case if the resin had been given an additional high degree of cure, and thus any likelihood of the overlay sheet becoming broken or cracked in handling or storage prior to its bonding to the board is also eliminated. The sheet preferably is formed into a roll, as is customary with ordinary paper, since this is the most convenient form for shipping or storage until final use of the sheet. If desired, the sheet of the present invention can be stored for an indefinite period of time under normal room temperature conditions before being bonded to the board without any significant change in its characteristics.

After the sheet is made on the paper machine, it is coated on one side with a thermosetting resin glue. Various types of resin glues may be used for this purpose. For example, thermosetting phenol-formaldehyde or urea-formaldehyde resins, or proteinaceous adhesives may be applied. However, I prefer to use a resin glue composition comprising a modified thermosetting, alkaline, water-soluble phenol-formaldehyde resin and a minor proportion of a polyvinyl acetate emulsion. Such composition is described in the pending application, Serial No. 375,848, filed August 21, 1953, by R. J. Herschler, et al., and entitled "Thermosetting Adhesive and Method of Making the Same."

The resin glue is applied to the resin-containing paper as a continuous film coating in the amount of between 5 lbs. and 10 lbs. resin glue per 1000 square feet of paper. After the coating has been dried by any suitable means, such as by passing through a dryer, as indicated at 18 in Figure 2, merely for the purpose of substantially evaporating the water from the glue coating, the coated resin-containing paper is ready for the final step, i. e. bonding to the surface of a woody material.

The bonding of the coated overlay paper to the face of a wood panel is generally carried out in a multiple-opening hot press (not shown) commonly used in the plywood industry. By using a press of such type, a relatively large number of panels can be overlaid simultaneously. The overlay sheets and wood panels are set up in proper sequence, and the entire group assembly is subjected to pressure and heat for a determined period of time in a one-step operation. My preferred pressing conditions are as follows: pressure from about 150 to about 220 pounds per square inch, temperature from about 270° F. to about 320° F., and time from about 5 to 10 minutes. The panels with their overlay sheets should not be subjected to the heating elements for more than about 1½ minutes without pressure being applied, since this would impair the subsequent bonding.

Under these conditions, the resin in the sheet and the resin glue are substantially cured, although if the assembly were subjected to more drastic temperature and pressure conditions, further cure of the resins would be achieved. However, it must be understood that the degree of cure attained under the above specified preferred conditions is sufficient for practical purposes to impart satisfactory properties to the finished smooth overlay.

Normally, smooth caul platens made from sheet aluminum are used in order to get a perfectly smooth overlay surface. However, other materials such as galvanized sheet steel, rolled sheet brass, or plastic laminates may be used satisfactorily as smooth platens.

*Example*

The following is a detailed example illustrating the carrying out of my invention in a preferred and highly satisfactory manner for producing an overlaid plywood panel:

90 parts (oven dry weight) of unbleached sulfite pulp, Jordan-refined to about 600 milliliters Canadian Standard Freeness were blended with 10 parts (oven dry weight) of book-grade ground wood pulp and with sufficient water in a conventional paper beater so that a pulp slurry of about 3% consistency was formed. To avoid further beating of the pulp, the beater roll was raised off the bed plate. Thus the beater served merely as a means of circulating and mixing the pulp slurry. The pulp slurry was then heated by steam to about 75° F. An aqueous solution of the phenol-aldehyde resin Amres 1410, containing about 25% solids, was prepared by diluting the original liquid resin containing about 50% solids with an equal amount of water heated to about 90° F. 132 parts of the 25% resin solution, equivalent to 33 parts by weight of resin solids per 100 parts (oven dry weight) of the blended pulp, was run into the beater in such a manner as to allow thorough mixing of the ingredients. After a substantially uniform mixture of the resin particles and the pulp slurry was obtained, the resin was precipitated and deposited on the fibers by adding slowly to the beater furnish about 20 parts of a 15% aqueous solution of papermaker's alum, which was sufficient to reduce the pH of the slurry to about 4.5. The fibrous furnish was then dumped to the machine chest, allowed to remain there for about 30 minutes while mildly agitated, and then formed into a sheet on a conventional paper machine running at a speed of 83 feet per minute, the length of the sheet in the drying section being 230 feet. The total length of time during which the sheet was in the drying section of the machine was thus approximately 2¾ minutes during which time the temperature of the sheet was raised from about 100° F. to a final temperature of about 212° F. It will be understood by those familiar with the art of paper making that the time during which the sheet attained the maximum temperature of about 212° F. was only a small fraction of the total time of about 2¾ minutes required for the sheet to pass through the drying section. A finished resin-containing sheet having a basis weight of about 190 pounds per ream of 3000 square feet and a moisture content of about 7% was thus produced. (For an adequate surfacing of a woody material, the basis weight of the sheet may be varied from about 170 pounds to about 225 pounds per ream.)

The resin-containing paper was then coated on one side thereof with a thermosetting resin glue using approximately five pounds of resin glue per 1000 square feet of the paper. The resin glue used was a composition consisting of 100 parts of the phenol-formaldehyde resin "Amres 1400," manufactured by the American Marietta Company, 14.5 parts of a polyvinyl acetate resin "Elvacet 81–900," manufactured by the E. I. du Pont de Nemours and Company, 8 parts of walnut shell flour, 0.04 part of 28% ammonium hydroxide, and 37.5 parts water, all parts being expressed as parts by weight.

The resin containing papers was placed on a plywood panel, with the coated side of the paper against the plywood and the two were set in a hot press, provided with smooth caul platens, and subjected to a pressure of approximately 200 lbs. per square inch and a temperature of approximately 300° F., and held under such pressure and temperature for about 7 minutes.

The resulting composite overlaid plywood panel had a hard, smooth, weather-resistant, abrasion-resistant, water-resistant surface, and the surface was very suitable for painting.

The overlaid plywood panel above described was subjected to a weathering test in accordance with that devised by the National Bureau of Standards, entitled "Accelerated Aging of Fiber Building Boards," and described in "Building Materials and Structures," Report BMS4, National Bureau of Standards, U. S. Department of Commerce (1938). The overlaid plywood panel passed successfully 6 cycles of this test; there was no checking, cracking or delamination.

An overlaid plywood panel produced in accordance with my invention has superior resistance to water-absorption, as shown by the following table, giving the comparative results of the U. S. Air Force Specification 15015-A moisture-absorption test applied to such a panel, to a similar panel having an overlay of customary resin-impregnated paper, and to a panel of exterior grade plywood without any overlay.

| Material | Soaking Time | | |
|---|---|---|---|
| | 4 hours | 24 hours | 48 hours |
| ⅜-inch plywood overlaid with my resin-containing paper | 8–10 | 18–20 | 26–28 |
| ⅜-inch plywood overlaid with resin-impregnated paper | 17–19 | 32–34 | 38–40 |
| ⅜-inch exterior-grade plywood | 34–36 | 50–52 | 68–70 |

The above figures indicate number of grams of water absorbed per square foot of plywood surface submerged and soaked in water for a given time. It is apparent that my improved product has a greater resistance to water-absorption, and thus a greater resistance to swelling and grain-raising, than either plywood overlaid with a resin-impregnated paper or regular exterior grade plywood.

The enhanced physical properties added to the plywood or other woody board, when made into a composite product with an overlay in accordance with my invention, render such overlaid materials more suitable for various uses such as house sidings, highway traffic signs, boat hulls, truck bodies, and in other situations where the check-free surface, long paint-film life, and good resistance to permanent outdoor exposure are required. Such overlaid woody materials are equally well suited for interior uses, such as in cabinets, built-ins, book-cases, wall panels and the like, where durability and the other characteristics previously mentioned are also important.

I claim:
1. An improved, flexible, resin-containing fibrous cellulosic sheet for specific use as an overlay for woody board, said sheet containing a high-molecular weight, thermosetting, phenolaldehyde resin in the amount of from about 10% to about 100% of resin solids by weight, based on the dry weight of the fibers in said sheet, the entire amount of said resin having been added to aqueous fibrous slurry, uniformly distributed therein, precipitated on the fibers with an acidic agent, and then only partly cured during the passage of said sheet through the drying section of a paper making machine, said sheet having on one side thereof a substantially dry film of a thermosetting resin glue, and being characterized by a substantial lack of brittleness.

2. An improved composite board comprising a base board of woody material and a fibrous, cellulosic overlay sheet containing a high-molecular weight, thermosetting, phenol-aldehyde resin in the amount of from about 10% to about 100% of resin solids by weight, based on the dry weight of the fibers in said sheet, the entire amount of said resin having been added to aqueous fibrous slurry for making said sheet and precipitated on the fibers with an acidic agent, the resin then being only slightly cured during the passage of said sheet through the drying section of a paper machine, said sheet having a coating of thermosetting resin glue and bonded to a face of said base board, the resin in said sheet having been substantially cured during the bonding of said sheet to said base board thereby producing a permanent intimate bond, the overlaid face of the resulting composite board being characterized by a durable, smoothly finished, weather-resistant, low paint demand surface.

3. In a composite board comprising the combination of a base board of woody material and a fibrous, cellulosic overlay sheet having a coating of thermosetting resin glue and bonded to a face of said base board, the improvement in the combination which consists in having a high molecular weight, thermosetting, phenol-aldehyde resin contained in said sheet in the amount of from about 10% to about 100% of resin solids by weight, based on the dry weight of the fibers in said sheet, the entire amount of the contained resin having been added to an aqueous fibrous slurry for the sheet, uniformly distributed therein, precipitated on the fibers with an acidic agent, and only partly cured in the making of the sheet but substantially fully cured during the bonding of the sheet to the base board, the sheet being intimately and permanently bonded to the base board, and the resulting overlaid face of the composite board being characterized by a durable, smoothly finished, weather-resistant, and low paint demand surface.

4. The improved method of making overlaid woody material which includes producing a resin-containing, fibrous, cellulosic, overlay sheet by adding to an aqueous slurry of cellulosic fibers a liquid, high-molecular weight, thermosetting, alkaline, water-soluble, phenol-aldehyde resin, said resin being added to said slurry in the amount of from about 10% to about 100% of resin solids by weight based on the dry weight of the fibers and distributed substantially uniformly throughout said slurry, precipitating said resin on said fibers in the slurry with an acidic agent, forming a flexible, cellulosic sheet on a paper machine from said slurry while gradually raising the temperature of the sheet during its passage through the drying section of the paper machine to about 212° F., the period of time during which the sheet has attained the temperature of about 212° F. in said drying section being considerably less than four minutes and sufficient to produce only a limited partial cure of the resin in the sheet, so that said resin will possess good flow characteristics upon subsequent hot-pressing of said sheet to the woody material to be overlaid, coating one side of said sheet with a thermosetting resin glue, covering one face of a plywood board having an irregular surface with said sheet with the coated side of said sheet in contact with said face of said plywood board, placing said plywood board and sheet in a hot press, and subjecting them to a temperature of about 270° F. to 320° F. and a pressure of about 150 to 220 pounds per square inch for a period of about 5 to 10 minutes, whereby the resin in said sheet will be caused to flow and then to be substantially cured so as to effect an intimate and a permanent bond between said sheet and said face of said plywood board, thereby forming a durable, smoothly-finished, weather-resistant, overlaid surface for said plywood board.

5. The improved method of making overlaid woody material which includes producing a resin-containing fibrous, cellulosic, overlay sheet by providing an aqueous slurry of cellulosic fibers, insuring that the temperature of said slurry is between about 70° F. and 80° F., adding to said slurry a liquid, high-molecular weight, thermosetting, alkaline, water-soluble, phenol-formaldehyde resin, characterized by its water dilutability of about 1.5 to 5 parts water to 1 part resin at the temperature of 25° C. and its beater stickpoint from about 90° F. to about 105° F., said resin being added to said slurry in the amount of from about 10% to about 45% of resin solids by weight based on the dry weight of the fibres, distributing said resin substantially uniformly throughout said slurry, precipitating said resin on said fibers in the slurry with an acidic agent and reducing the pH value of said slurry to about 4.5, forming a flexible, cellulosic sheet on a paper machine from said slurry while gradually raising the temperature of the sheet during its passage through the drying section of the paper machine to about 212° F., the period of time during which the sheet has attained the temperature of about 212° F. in said drying section being considerably less than 4 minutes and sufficient to produce only a limited partial cure of the resin in the sheet, so that said resin will possess good flow characteristics upon subsequent hot-pressing of said sheet to the woody material to be overlaid, coating one side of said sheet with a thermosetting resin glue, covering one face of a woody board with said sheet with the coated side of said sheet in contact with said face of said board, placing said board and sheet in a hot press, and subjecting them to a temperature of about 270° F. to about 320° F. and a pressure of about 150 to 220 pounds per square inch for a period of about 5 to 10 minutes, whereby the resin in said sheet will be caused to flow and then to be substantially cured so as to effect an intimate and a permanent bond between said sheet and said face of said board, thereby forming a durable, smoothly-finished, weather-resistant, overlaid surface for said board.

6. The improved method of making a flexible sheet for specific use in overlaying a face of a woody panel, which method comprises providing an aqueous slurry of cellulosic fibers, insuring that the temperature of said slurry is from about 70° F. to 80° F., adding to said slurry a liquid, high-molecular weight, thermosetting, alkaline, water-soluble, phenol-aldehyde resin in the amount of from about 10% to about 100% of resin solids by weight based on the dry weight of the fibers, distributing said resin substantially uniformly throughout said slurry, precipitating said resin on said fibers in the slurry with an acidic agent, forming a substantially dry sheet from the resin-containing slurry on a paper machine, the drying of said sheet in the drying section of the paper machine being effectuated in such a manner that the temperature of the sheet will not be higher than about 212° F. and the period of time required for the passage of said sheet through said drying section of the paper machine will not exceed approximately 4 minutes and be insufficient to produce more than a limited, partial cure of the resin in the sheet so that said resin will flow when said sheet is subsequently hot-pressed as an overlay on a face of a woody panel, coating one side of said sheet with a thermosetting resin glue, and drying said glue, thereby producing a continuous film coating on said sheet.

References Cited in the file of this patent
UNITED STATES PATENTS

| | | |
|---|---|---|
| 2,319,267 | Sawyer | May 18, 1943 |
| 2,343,740 | Birmingham | Mar. 7, 1944 |
| 2,497,712 | Auchter | Feb. 14, 1950 |
| 2,656,296 | Grangaad | Oct. 20, 1953 |
| 2,666,726 | King et al. | Jan. 19, 1954 |